United States Patent [19]

Huberman

[11] 4,405,158

[45] Sep. 20, 1983

[54] AIR FILLER ADAPTER

[76] Inventor: Richard Huberman, 7740 Bridlepath La., McLean, Va. 22101

[21] Appl. No.: 266,643

[22] Filed: May 26, 1981

[51] Int. Cl.³ .............................................. A47L 9/24
[52] U.S. Cl. ....................................... 285/7; 285/177; 285/12; 137/223; 15/405; 15/415 R
[58] Field of Search .................. 137/223; 15/405, 415; 285/7, 12, 4, 177

[56] References Cited

U.S. PATENT DOCUMENTS

| 1,702,322 | 2/1929 | Snowdon ........................ 285/177 X |
| 2,131,721 | 9/1938 | Hale ..................................... 285/12 |
| 3,368,302 | 2/1968 | Martino ........................... 137/223 X |
| 3,933,177 | 1/1976 | Dwyer ............................. 137/223 X |
| 4,114,230 | 9/1978 | MacFarland .................... 137/223 X |
| 4,120,129 | 10/1978 | Nagler ................................ 285/4 X |
| 4,133,312 | 1/1979 | Burd .................................. 285/12 X |
| 4,171,119 | 10/1979 | Lamson ........................... 137/223 X |

FOREIGN PATENT DOCUMENTS 1537833  8/1968  France ................................. 285/177

Primary Examiner—Harold W. Weakley
Attorney, Agent, or Firm—Sherman & Shalloway

[57] ABSTRACT

An air-filler adapter is provided wherein an outer shell is adapted to fit various large diameter air supply hoses such as vacuum cleaner hoses, and a smaller diameter stem portion fits a variety of low pressure and medium pressure air filler openings used to inflate various inflatable consumer goods. The stem portion extends beyond the outer shell and has an outer tip which is adaptable to various air filler valves which are smaller than the vacuum cleaner hoses.

The adapter comprises a pair of concentrically disposed tubes, the inner of which fits schrader air chucks on one end and fits the air filler openings for the consumer goods on the other end. The outer tube is sized to fit low-pressure pressurized air sources such as vacuum cleaner hoses and has an end wall which seals against the outside of the inner tube.

1 Claim, 2 Drawing Figures

AIR FILLER ADAPTER

BACKGROUND OF THE INVENTION

1. Field of the Invention

This invention relates to air filler adapters and more particularly to air filler adapters adapted for receiving medium and low pressure air supplies from a variety of sources in order to inflate these consumer goods.

2. Description of the Prior Art

While the prior art relating to the nozzles is quite extensive, most nozzles are adapted to only one or a very few types of fluid supply fittings. For example, fluid adapters are normally available for connecting a common garden hose to an indoor water tap. The water tap's aerator tip is removed and the adapter screws onto the faucet in place of the aerator. Most of these adapters have various thread diameters as well as plastic double-threaded sleeves so as to permit the user to connect his adapter to various faucet tips having slightly different thread sizes. The other end of the adapter is threaded to conform to a conventional garden hose which may then be used to wash cars, fill beds, etc. Vacuum cleaner accessories are often provided with adapters for connecting these accessories to vacuum cleaner hoses made by various manufacturers. There are also adapters on the market which connect vacuum cleaner hoses to air matresses in order to inflate the air mattress quickly. One example of such a device is disclosed in U.S. Pat. No. 4,114,230 to MacFarland.

Various arrangements have been proposed to adapt air from a service station air supply to various fittings in order to fill various articles. For example, most service station air supplies use quick-release hose couplings to which various chucks are applied. These chucks generally include air chucks having schrader valve-actuated shut-off valves which permit air to escape only when the chuck is pressed against a schrader valve, filler fittings for dual tires, and specialized fittings having built-in pressure gages.

Various fittings are available for connecting such schrader valve air chucks to tires having presta or woods pressure-differential type tire valves. These generally consist of a tube having inside threads on one end to fit over the presta valve and outside threads on the other end to conform to the schrader valve air chuck or a pump with a schrader valve inflator fitting.

A person having various inflatable items may find that each inflatable item has a different type of air fitting. For example, he may have an air mattress, in his home for a guest, which might have a wide-mouth air fitting, a camping air mattress having a smaller fitting and a bicycle having presta air valves on its tire tubes. A presta air valve has a smaller outside diameter than a schrader valve and, as is well known to those who use such valves, requires an adapter for inflation with a schrader air chuck. He may wish to inflate these items from various air sources such as a portable air pump (either electric or manually operated), a vacuum cleaner exhaust, a hair dryer and a gas station air supply. While clearly a hair dryer would be somewhat ineffective in inflating the bicycle tires to over 8 Kg/cm$^2$ (115 psi), it would be desirable to have a single fitting which would adapt a variety of air sources to a variety of inflatable items so that each item could be inflated from any of the available air sources, provided that the air source presents sufficient pressure to inflate or partially inflate the inflatable item.

SUMMARY OF THE INVENTION

Accordingly, it is an object of the invention to provide an inflation adapter which permits the inflation of a wide variety of inflatable items from a wide variety of sources. It is a further object of the invention to provide an apparatus which permits inflation of a wide variety of low pressure inflatable items such as air mattresses and beach balls having different inflator opening sizes from a variety of air sources including air provided by a vacuum cleaner hose connected to a vacuum cleaner air exhaust, and air provided by a tire inflation compressor through a fitting intended to fit on a schrader valve. It is a further object of the invention to provide a means for inflating a wide variety of inflatable consumer goods from a variety of compressed air sources, provided that the particular compressed air source provides air at a pressure sufficient for inflating the inflatable item. It is a further object of the invention to provide such a means for adapting a wide variety of compressed air sources to a wide variety of inflatables with a single unitary adapter fitting.

According to one aspect of the invention a nozzle adapter is provided having an outer shell and an inner stem portion joined through a bottom section of the outer shell. The outer shell is adaptable to fit a variety of low pressure compressed air sources such as a vacuum cleaner hose connected to a vacuum cleaner exhaust, and the stem is provided with air inlet and outlet tips. The air inlet tip extends from within the shell portion to receive an air chuck intended to fit onto a schrader valve, while outlet tip extends away from the conical shell as an outside contour which fits into a wide variety of filler openings for consumer inflatables.

In a further aspect of the invention, the outlet tip is, at least in part, resilient so as to resiliently engage the outside of a presta-type air valve, such as is used on a bicycle tire.

DESCRIPTION OF THE PREFERRED EMBODIMENTS

Figure 1:
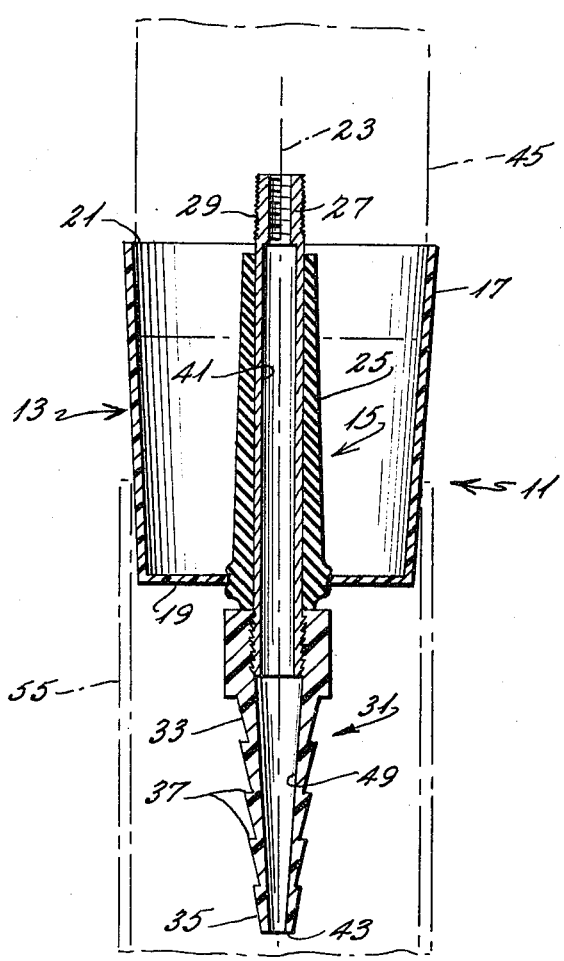
FIG. 1 shows a cross-sectional view of the adapter according to one embodiment of the present invention.

Referring to FIG. 1, the adapter 11 comprises an outer section 13 and a stem portion 15. The outer section 13 consists of an outer shell 17 which tapers outwardly in a frustra-conical shape from a bottom part 19 to an upper lip 21. The frustra-conical shape of the outer shell 17 has a central axis 23 which is the center axis of adapter 11. The stem portion 15 extends through the bottom part 19 and shares the center axis 23 with the outer section 13. An inlet section 25 of the stem 15 extends within the outer section 13 from the bottom part 19 and terminates at an inlet tip 27. The inlet tip 27 is preferably formed in the shape of the inlet to a schrader valve having screw threads which fit fittings which screw into schrader valves. The inlet tip 27 extends beyond the upper lip 51 because it is desirable that most types of air chucks that normally fit schrader valves be able to fit onto inlet tip 27.

The inlet tip 27 is therefore preferrably between 7 mm and 8 mm in diameter, with standard specifications for schrader valve dimensions being matched to the extent practical.

The stem portion 15 extends from the inlet tip 27 through inlet section 25 past the bottom part 19 of the outer section 13 to filler fittings 31. Filler fitting 31 tapers from the moderately large diameter part 35 further from the section 25 than the moderately large diameter part 33. The tapering diameter of the filler fitting 31 is designed so the filler fitting 31 would be able to engage most low-pressure inflation valves for inflatable consumer goods. The filler fitting 31 may be provided with ridges 37 in order to more securely engage resilient surfaces on inflatable items, with the ridges 37 further providing a sealing function. Alternatively, the filler fitting will have a smooth outside contour as shown on filler fitting 31' in FIG. 2.

A center bore 41 permits pressurized air provided at the inlet tip 27 to be communicated to the stem portion 15 to the exterior of filler fitting 31 at outlet tip 43. It can therefore be appreciated that, whether pressurized air is supplied directly to inlet tip 27 by a schrader chuck or through a part mating with the outer shell 17, that pressurized air will be communicated to the outlet tip 43. For example, as can be seen in FIG. 1, a vacuum cleaning tube 45 of the type normally associated with vacuum cleaning tools and connected to the exhaust of a vacuum cleaner (not shown) would provide a source of low pressure air which would be communicated through outlet tip 43 to anything connected to lower fitting 31.

It is possible to assemble the apparatus in a number of different ways. For example, in the embodiment of FIG. 1, the stem portion 15 is constructed from a used tire valve stem removed from an automobile wheel. Such stems are usually discarded or sold as scrap. The tire valve stem then forms the inlet section 25, including the inlet tip 27 and extends through the bottom part 19 of the outer section 13. The filler fitting 31 may be then fitted onto the valve stem, thus providing a sturdy stem portion 15 while permitting the assembly to be constructed from component parts which are inexpensive or fabricated without great difficulty. The valve stem results in the inlet section 25 being of a very high strength because of the copper and rubber construction of such valve stems. A further advantage of using a tire valve stem in the construction is that the center bore 41 at the inlet tip 27 is threaded so as to normally receive a schrader valve core.

While such valve cores (not shown) are designed to operate with a member in an air supply mechanically depressing a part of the valve core, rather than by differential pressure, this function is not necessary and may not be desired in the use of the adapter; however, the valve core also functions as a trigger mechanism for different types of air filler chucks. For this reason, it may be desired to install the schrader valve core, regardless. In order to overcome difficulties which would result from a mechanically-actuated valve in the center bore 41, the spring member on the schrader valve core may be wholly or partially removed prior to the insertion of the schrader valve inside the inlet tip 27.

Figure 2:
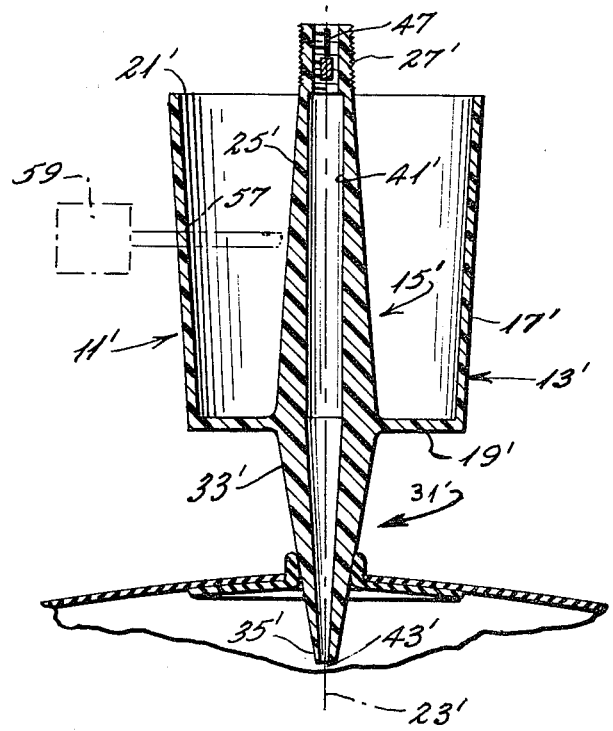
FIG. 2 is a cross-sectional view of an alternate embodiment of the present invention.

As can be seen in FIG. 2, an adapter 11' may be fabricated in an inexpensive manner without the use of pre-existing used components. In that figure, components with similar functions to the components in the embodiment of FIG. 1 are identified with the same numbers, primed. More specifically, the modified adapter 11' comprises an outer section 13' and a stem portion 15' in concentric alignment about a central axis 23'. Outer section 13' comprises outer shell 17' which terminates in bottom part 19' forming an end wall to outer section 13' which seals against stem portion 15'. Stem portion 15' comprises inlet section 25' and filler fitting 31' and has therein a center bore 41' extending from an inlet tip 27' through to an outlet tip 43'.

As can be seen from the figure, the stem portion 15' is molded as a single piece with the bottom part 19' also being formed unitarily with the stem portion 15'. The outer shell 17' may also be molded with the stem portion 15', although it may be easier to mold to the outer shell 17' separately, and then bond it to the bottom part 19'. Instead of requiring that a schrader valve core be located and modified, it is possible to provide a trigger tip 47 as an integral part of the stem portion 15'. The trigger tip 47 is merely a tab extending from the center bore 41' at the inlet tip 27' along the center axis 23' in a manner which would trigger an outlet valve in a valved schrader air chuck to permit release of air through the air chuck in the customary manner. Since the only function of trigger tip 47 is to mimic the tip and of a schrader valve core, trigger tip 47 is constructed to minimize obstruction to air flow through center bore 41'.

The center bore 41' may also be used to fit over pressure differential-operated valves such as presta valves, etc. As described above, a presta valve, commonly found on some bicycle tire tubes, has a smaller outside diameter than a schrader valve and, as is known to these who use tire tubes with presta valves, requires a special adapter to permit inflation with a schrader air chuck. These valves normally open for inflation when air pressure applied outside the valve is greater than air pressure inside the tire tube. In this case, the outlet tip 43' is placed over the presta valve so that the presta valve is now communicating with the center bore 41. When air pressure at the center bore 41 is greater than air pressure in the tire tube, the presta valve will admit air in the customary fashion. While it is obvious that vacuum cleaner exhaust would be useless in inflating a bicycle tire requiring a minimum of 7 Kg pressure, the adapter 11' would be useful in providing the air from many air sources such as service-station compressors to the presta valve.

In the event that it is desired to provide apparatus for people having mouth-inflatable items with very small openings, as well as for others who would use the adaptor with a presta valve, it is possible to provide a tapering portion 49 to the inner bore 41, as can be seen in FIG. 1. Therefore, if the user wishes to convert adapter 11 from use with very small mouth openings to be used with presta valves, it is only necessary to cut a portion of the filler fitting 31 near the small diameter part 35.

It should be noted that, while a wide variety of materials may be used to construct the adapter, the materials must be rigid enough to obtain a relatively stable shape when compressed against various air fittings such as an air chuck or a vacuum cleaner tube 45. On the other hand, a certain amount of resiliency is also necessary in order that the adapter 11 or 11' will be able to sealingly grip the various air fittings. This is particularly true of presta valves because of the relatively high air pressure involved and with the vacuum cleaner tubes because of the tendency of rigid materials to separate when air pressure is applied.

While a preferred embodiment of my apparatus has been described, it is to be understood that various modifications may be incorporated in the actual structure.

For example, the stem portion 15 could be made readily removable by the consumer so that the apparatus 11 will further function as an adapter for the different sized low pressure tubes or vacuum tubes such as vacuum cleaner tube 45 and another vacuum cleaner tube 55 (shown in FIG. 1). Referring to FIG. 2, it is also possible to provide a small-sized opening 57 to permit the storage of a ball inflator 59. Opening 57 would function as a storage carrier for the ball inflator 59 and the inflator 59 could then be removed to directly inflate items such as basketballs with or without the further use of the adapter 11'. While not substantially interferring with low-pressure air which would occur within the outer section 13', such a hole does not penetrate the center bore 41 and does not constitute a leak when medium pressure air is applied directly to the inlet tip 27'.

Accordingly, the apparatus, as proposed, should be considered limited only by claims and not by the specific embodiments set forth herein.

I claim:

1. A nozzle adapter for providing medium and low inflation pressure from a variety of air sources to air fittings of diverse sizes comprising:

(a) an outer frustro-conical shell having a central axis, inner and outer surfaces and an outer circular lip, the outer circular lip being at the location of the largest diameter of the outer shell, the outer shell having an inside diameter which tapers gradually inwardly so that the inner and outer surfaces of the shell gradually decrease in diameter toward a bottom surface;

(b) said bottom surface having an opening in the center thereof;

(c) an annular stem means including a first stem and a second stem within said first stem, said first stem being sealingly mounted in said bottom surface opening and including an end remote from said bottom surface located within said shell, said second stem including a first end extending through said bottom surface opening and outside said shell, said second end including exterior threads and further including interior threads forming an inlet to said second stem, said second stem first end including on an exterior surface thereof coupling means;

(d) a coupling member sealingly coupled to said coupling means of said second stem and abutting said first stem, said coupling member including a tapered passageway extending from a large diameter portion adjacent said coupling means to a small diameter portion adjacent an outlet of said coupling member, said coupling member further including a plurality of ridges extending from said location adjacent said large diameter portion to a location adjacent said coupling member outlet, said ridges enabling coupling of said coupling member to an inflatable object, said coupling member generally tapering from a large diameter adjacent to said coupling means to a small diameter adjacent to said outlet thereof.

* * * * *